(12) United States Patent
Turner

(10) Patent No.: US 6,906,490 B2
(45) Date of Patent: Jun. 14, 2005

(54) STARTING OF SWITCHED RELUCTANCE GENERATORS

(75) Inventor: Michael James Turner, Leeds (GB)

(73) Assignee: Switched Reluctance Drives Limited, Harrogate (GB)

( * ) Notice: Subject to any disclaimer, the term of this patent is extended or adjusted under 35 U.S.C. 154(b) by 0 days.

(21) Appl. No.: 10/614,973

(22) Filed: Jul. 8, 2003

(65) Prior Publication Data

US 2004/0008003 A1 Jan. 15, 2004

(30) Foreign Application Priority Data

Jul. 9, 2002 (GB) .............................................. 0215849

(51) Int. Cl.[7] .............................................. H02P 1/46
(52) U.S. Cl. ..................... 318/701; 318/729; 310/181; 310/184
(58) Field of Search ................................ 318/701, 254, 318/138, 439, 729, 700, 696, 560; 310/184, 181, 90.5, 210, 156.01; 322/44; 361/111; 363/132

(56) References Cited

U.S. PATENT DOCUMENTS

| | | | | | |
|---|---|---|---|---|---|
| 4,058,746 A | * | 11/1977 | Mole et al. | ..................... | 310/10 |
| 5,113,113 A | * | 5/1992 | Tepavcevic | ................. | 318/701 |
| 5,168,203 A | * | 12/1992 | Tepavcevic | ................. | 318/701 |
| 5,844,343 A | * | 12/1998 | Horst | ......................... | 310/184 |
| 5,905,366 A | * | 5/1999 | Wilson | ......................... | 322/44 |
| 5,929,590 A | * | 7/1999 | Tang | ............................ | 318/701 |
| 5,936,370 A | * | 8/1999 | Fukao et al. | ................ | 318/652 |
| 5,998,945 A | * | 12/1999 | Elliott | ........................ | 318/254 |
| 6,002,233 A | * | 12/1999 | McCann | ..................... | 318/701 |
| 6,201,368 B1 | * | 3/2001 | Webster | ...................... | 318/729 |
| 6,495,985 B1 | * | 12/2002 | Mayes et al. | ............... | 318/701 |
| 6,559,567 B2 | * | 5/2003 | Schob | ........................ | 310/90.5 |
| 6,628,034 B2 | * | 9/2003 | Jang et al. | .................. | 310/210 |
| 2002/0047401 A1 | * | 4/2002 | Schoeb | ....................... | 310/90.5 |
| 2002/0047447 A1 | * | 4/2002 | Torok et al. | ................ | 310/181 |
| 2002/0075621 A1 | * | 6/2002 | Elliott | ......................... | 361/111 |
| 2003/0020436 A1 | * | 1/2003 | Coles et al. | .................. | 322/44 |

FOREIGN PATENT DOCUMENTS

| | | | |
|---|---|---|---|
| EP | 0564067 A2 | 10/1993 | |
| EP | 695020 A2 | * 1/1996 | .......... H02K/29/00 |

OTHER PUBLICATIONS

Stephenson, et al., "The Characteristics, Design and Applications of Switched Reluctance Motors and Drives," PCIM '93, Nürnberg, Germany, Conference & Exhibition, Jun. 21–24, 1993, pp. 1–68.

Radun, Arthur, "Generating With the Switched Reluctance Motor," Department of Electrical Engineering, University of Kentucky, pp. 41–47, 1994 IEEE.

* cited by examiner

Primary Examiner—Paul Ip
(74) Attorney, Agent, or Firm—Dicke, Billig & Czaja, PLLC

(57) ABSTRACT

A switched reluctance drive is operated as a generator on a high voltage supply which has no long-term energy storage capability. A low voltage supply is used to start the generator through the use of a dedicated priming winding, which provides sufficient energy to allow the generator to build up charge in DC link capacitor(s). Once sufficient charge has built up, the priming winding is de-energized and the generator continues in a steady-state operation.

18 Claims, 6 Drawing Sheets

STARTING OF SWITCHED RELUCTANCE GENERATORS

CROSS-REFERENCE TO RELATED APPLICATION

The subject matter of this application is related to the subject matter of British Application No. 0215849.1, filed Jul. 9, 2002, priority to which is claimed under 35 U.S.C. § 119 and which is incorporated herein by reference.

BACKGROUND OF THE INVENTION

1. Field of the Invention

The present invention generally relates to an apparatus and method for starting an electrical generating system. More particularly, the present invention relates to the operation of a switched reluctance generator for generating into a supply system which has no long-term energy storage capabilities.

2. Description of Related Art

The characteristics and operation of switched reluctance systems are well known in the art and are described in, for example, "The characteristics, design and application of switched reluctance motors and drives" by Stephenson and Blake, PCIM'93, Nürnberg, 21–24 Jun. 1993, incorporated herein by reference. FIG. 1(a) shows a typical switched reluctance drive in schematic form, arranged to operate as a motor. The switched reluctance machine 12 is connected to a load 19. The DC power supply 11 can be either a battery or rectified and filtered AC mains or some other form of energy storage. The DC voltage provided by the power supply 11 is switched across the phase windings 16 of the machine 12 by a power converter 13 under the control of the electronic control unit 14. The switching must be correctly synchronized to the angle of rotation of the rotor for proper operation of the drive, and a rotor position detector 15 is typically employed to supply signals corresponding to the angular position of the rotor. The rotor position detector 15 may take many forms, including that of a software algorithm, and its output may also be used to generate a speed feedback signal. The presence of the position detector and the use of an excitation strategy which is dependent on the instantaneous position of the rotor leads to the generic description of "rotor position switched" for these machines.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A low-value resistor 28 is connected in series with the lower switch to act as a current-sense resistor. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter.

FIGS. 3(a)–3(c) show typical waveforms for an operating cycle of the circuit shown in FIG. 2 when the machine is in the motoring mode. FIG. 3(a) shows the voltage being applied at the "on angle" $\theta_{on}$ for the duration of the conduction angle $\theta_c$ when the switches 21 and 22 are closed. FIG. 3(b) shows the current in the phase winding 16 rising to a peak and then falling slightly. At the end of the conduction period, the "off angle" $\theta_{off}$ is reached, the switches are opened and the current transfers to the diodes, placing the inverted link voltage across the winding and hence forcing down the flux and the current to zero. At zero current, the diodes cease to conduct and the circuit is inactive until the start of a subsequent conduction period. The current on the DC link reverses when the switches are opened, as shown in FIG. 3(c), and the returned current represents energy being returned to the supply. The shape of the current waveform varies depending on the operating point of the machine and on the switching strategy adopted. As is well-known and described in, for example, the Stephenson paper cited above, low-speed operation generally involves the use of current chopping to contain the peak currents, and switching off the switches non-simultaneously gives an operating mode generally known as "freewheeling".

As is well known in the art, switched reluctance machines can be operated in a motoring mode, as shown in FIG. 1(a), to drive load 19. In a generating mode, as shown in FIG. 1(b), the load 19 is replaced by a prime mover 19' to turn the switched reluctance machine and the power supply 11 is replaced with a load 11' for the generated electricity e.g. a storage battery or a device to be driven.

In the generating mode the phase currents are mirror images (in time) of the motoring currents. Such systems are discussed in, for example, "Generating with the switched reluctance motor", Radun, Proceedings of the IEEE 9th Applied Power Electronics Conference, Orlando, Fla., 13–17 Feb. 1994, pp 41–47, incorporated herein by reference. FIG. 4(a) illustrates a current waveform when the system is motoring and FIG. 4(b) illustrates the corresponding current waveform for generating. Flux is indicated by the dashed line. It will be seen from FIG. 4(b) that the machine requires a "priming" or magnetizing flux to be established (along with the necessary current to support this flux) before the larger current is returned to the DC link. In other words, some electrical energy is required from the DC link to prime the machine before it is able to convert the larger amount of mechanical energy back to the DC link.

With generating systems which are static (i.e. part of a fixed installation), there is usually a convenient source of energy from which to prime the machine. However some systems are not part of a fixed installation because they are fitted on, for example, marine or automotive equipment, so a special source has to be provided. In systems where the DC link has a relatively low value (e.g. 12V or 48V), it is conventional to incorporate a storage battery 50 in the system, connected across the DC link as shown in FIG. 5(a). This battery is available to provide sufficient energy to prime the phase(s) when the generator is called into action.

In systems where the DC link has a high value (e.g. 300V or more), it is difficult to provide a storage battery at that voltage because of cost and safety implications. Two options have hitherto been available.

Firstly, a low-voltage battery can be used with an up-converter 52, as shown in FIG. 5(b). This overcomes many of the safety problems associated with isolation of a high-voltage source, but is costly. In addition, unless the up-converter is bi-directional, some other form of battery charging must be provided to re-charge the battery, entailing further cost.

Secondly, the system can rely on the short-term energy storage provided by the DC link capacitors in the power converter. While this will be successful if the amount of charge left in the capacitors at the time of starting is sufficient to energize the machine adequately, there is no guarantee that the capacitors will hold their charge during a prolonged shutdown. Further, it is often a requirement that capacitors are discharged before any maintenance work is done on the converter, and this would preclude subsequently starting the system by this method.

There is therefore a need for economically starting a generating system on a bus which has no long-term storage.

SUMMARY OF THE INVENTION

In accordance with embodiments of the present invention, the foregoing disadvantages of known switched reluctance generators are overcome.

According to a first aspect of the invention there is provided a reluctance machine comprising a rotor having a plurality of rotor poles, a stator having a plurality of stator poles, at least one phase winding for exciting at least two of the poles and a priming winding to excite the poles.

The priming winding is provided to prime the reluctance machine when it is arranged to operate as a generator. This is achieved by arranging the priming winding to be connected, in use, to a power supply to excite the poles and to cause time-varying flux linkage in the or each phase windings. In use, the priming winding is then subsequently de-energized and the phase winding(s) used to excite the poles.

Thus, in use as a generator, the machine is primed using the priming winding and, once a suitable point is reached, the priming winding is switched out and the machine excited by energizing the phase winding(s). The point at which the priming winding is switched out of the circuit is largely under the control of the operator since the DC link only needs to be raised to a fraction of its normal operating voltage before conventional operation with the phase windings take place.

This allows the switched reluctance drive to be operated as a generator on a high voltage supply which has no long-term energy storage capability. A low voltage supply is used to start the generator through the use of a dedicated priming winding, which provides sufficient energy to allow the generator to build up charge in one or more DC link capacitors. Once sufficient charge has built up, the priming winding is de-energized and the generator continues in a steady-state operation. Unidirectional currents are carried by both the phase winding(s) and the priming winding(s).

The priming winding is connectable to a power source separate from that used to excite the phase windings, according to one embodiment. The reluctance machine is advantageously a switched reluctance machine, in particular operated as a generator. The phase winding(s) are optionally provided on the stator poles and the priming winding is also provided on the stator. The priming winding may extend along a longitudinal axis of the stator or the priming winding may be of a gramme-ring type, wound around a back iron part of the stator, or the priming winding may be provided around at least one of the stator poles. The phase windings are excitable by a DC link, for example, the ratio of the voltage of the DC link to the supply voltage for the priming winding being greater than 3.

The reluctance machine may further comprise means for connecting the priming winding to a source of priming electrical energy, the connecting means comprising a switch, a chopper unit or a current controller. The priming winding and its associated priming power source, and switching components if any, optionally are rated for short-term use, so reducing the cost of implementation.

In a second aspect of the invention there is provided a method of starting a switched reluctance generator comprising a rotor having a plurality of rotor poles and a stator having a plurality of stator poles, at least one phase winding defining one or more phases, and at least one priming winding, the method comprising: driving the rotor relative to the stator; energizing the priming winding by forming an electrical connection between the priming winding and a source of electrical energy to excite two or more of the poles and to cause time-varying flux linkage in the or each phase windings and subsequently de-energizing the priming winding.

Thus the generator is primed using the priming winding and, once steady state operation is reached, the priming winding is switched out (or de-energized) and the generator excited by energizing the phase winding(s) of the generator. The switched reluctance generator is connected to a DC link and the priming winding is de-energized once the DC link voltage has reached a pre-determined value and the phase winding(s) of the generator are then energized solely from the DC link.

The DC link has a DC capacitor which is connectable across the or each phase winding. The DC link capacitor is charged by supplying current from the or each phase winding to the DC link capacitor and the priming winding is disconnected from the source once the voltage of the DC link capacitor has reached a pre-determined value.

BRIEF DESCRIPTION OF THE DRAWINGS

Other aspects and advantages of the invention will become apparent upon reading the following detailed description of exemplary embodiments of the invention and upon reference to the accompanying drawings, in which.

DETAILED DESCRIPTION OF PREFERRED EMBODIMENTS

The Radun paper cited above discloses a starting method for a switched reluctance generator, whereby the excitation energy initially comes from a battery supplying an excitation bus for the phase windings of the machine. The generator returns all its output to that bus until the bus voltage rises to a suitable level, whereupon extra thyristor switches are closed to supply the output of the generator to the load. Steady state operation entails the use of both excitation buses and the extra thyristors. A similar system with split excitation and load buses is disclosed in European Patent Application No. 0564067, which is incorporated herein by reference.

By contrast with these prior art systems, embodiments of the present invention use a single bus and a separate priming winding which is used to pump up the voltage on the DC link capacitors. This is achieved by introducing initial flux linkage into the machine, thereby giving rise to a DC link voltage sufficient to enable the generator to operate in the conventional manner. The system will now be described in detail.

Figure 1A:
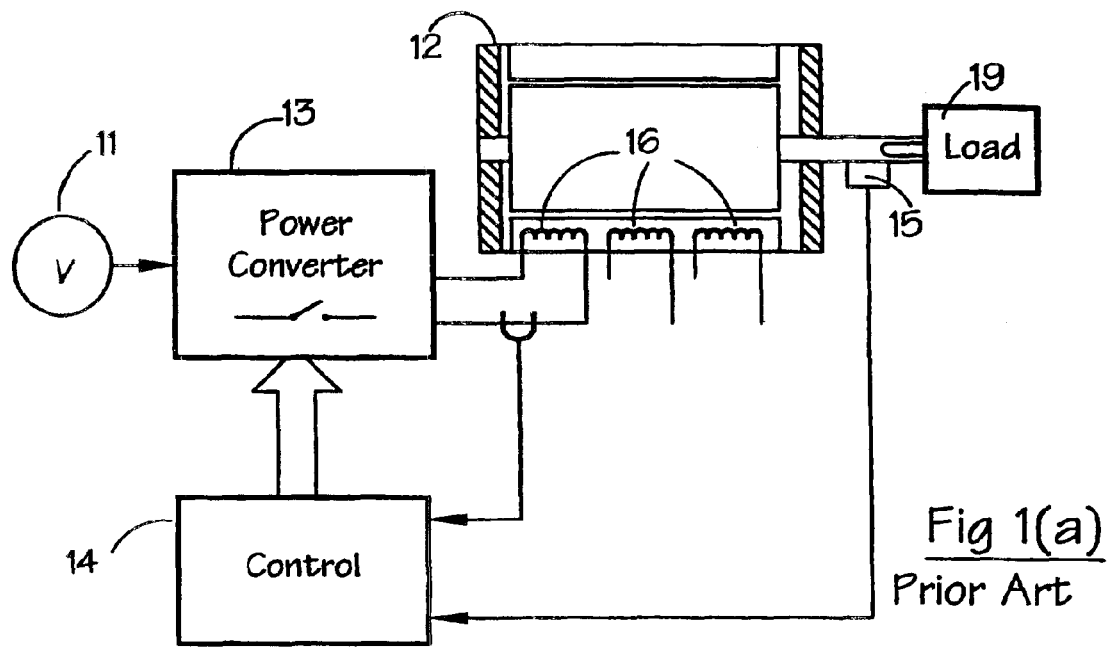
FIGS. 1(a) and 1(b) are schematic drawings of prior art switched reluctance machines.
Figure 1B:
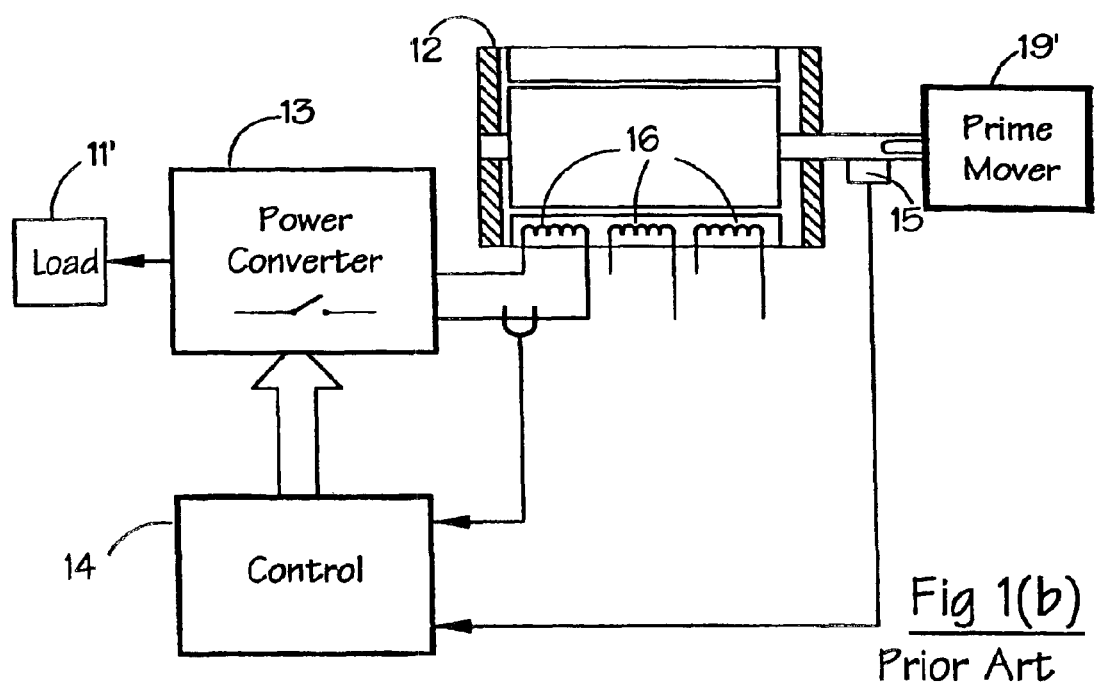
Figure 2:
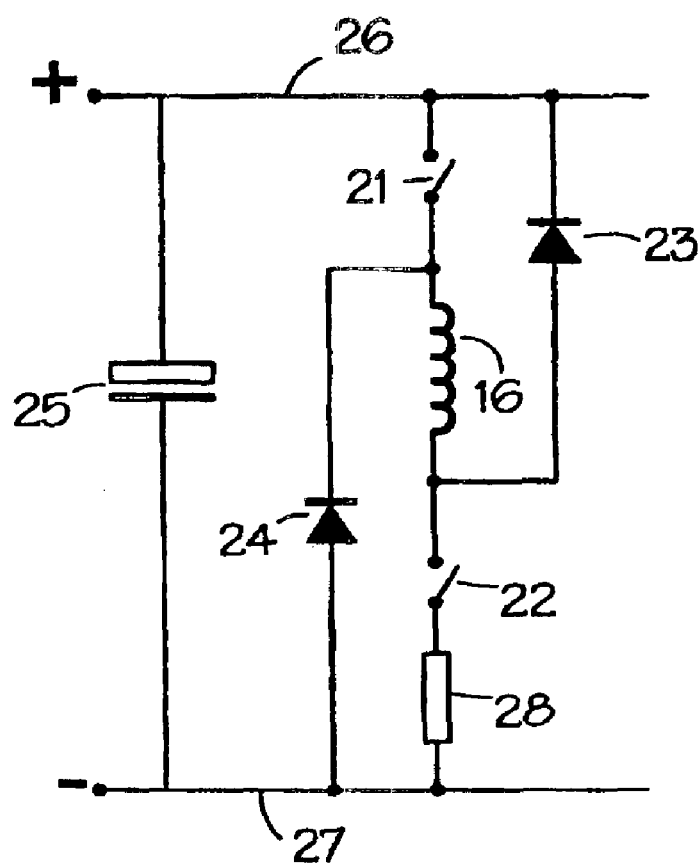
FIG. 2 is a prior art excitation circuit for the switched reluctance machines of FIGS. 1(a) and 1(b)
Figures 3A, 3B, 3C:
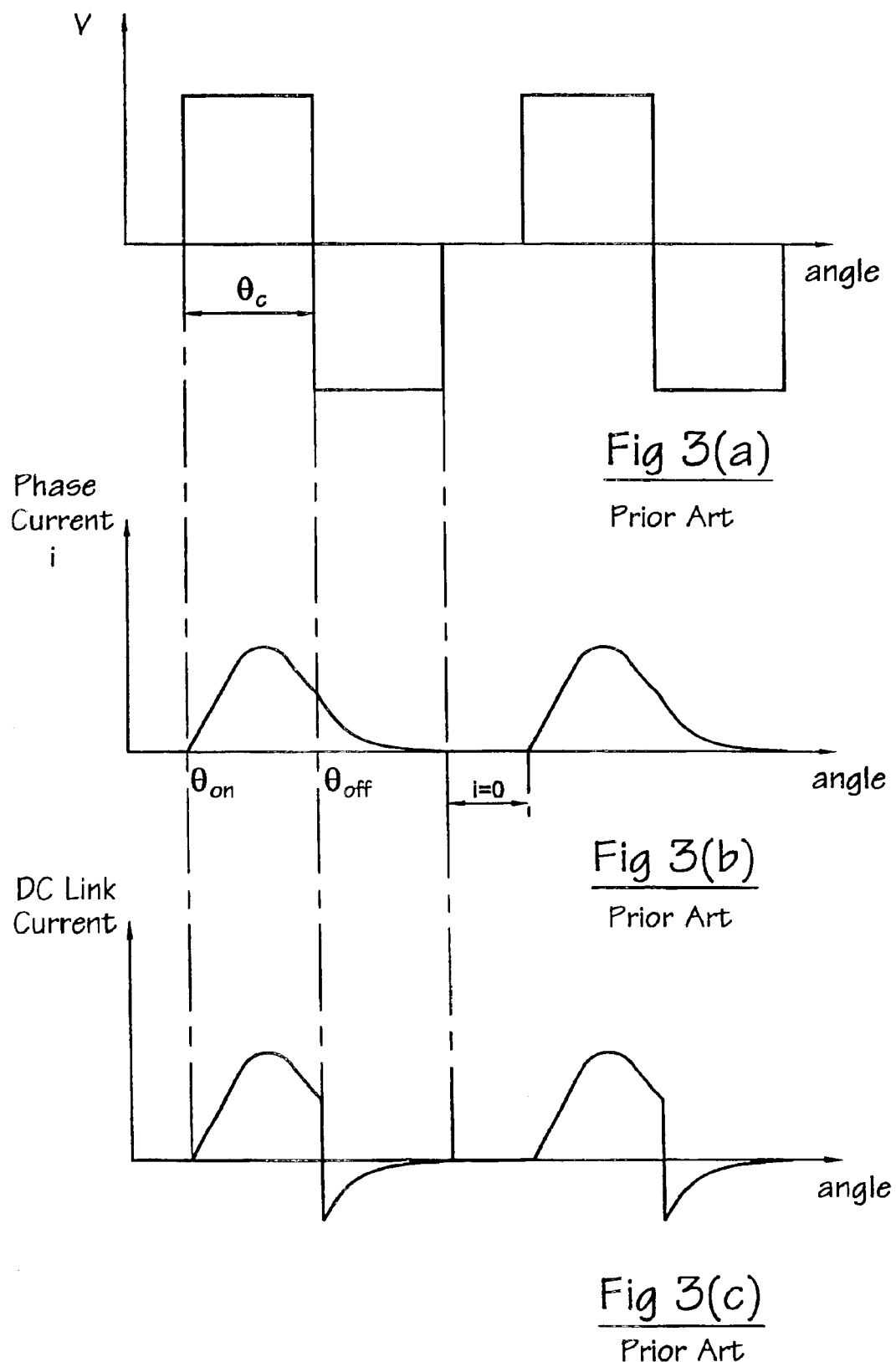
FIG. 3(a) is a phase voltage waveform for the circuit shown in FIG. 2.
FIG. 3(b) is a phase current waveform corresponding to FIG. 3(a)
FIG. 3(c) is a DC link current waveform corresponding to FIG. 3(a)
Figure 4A:
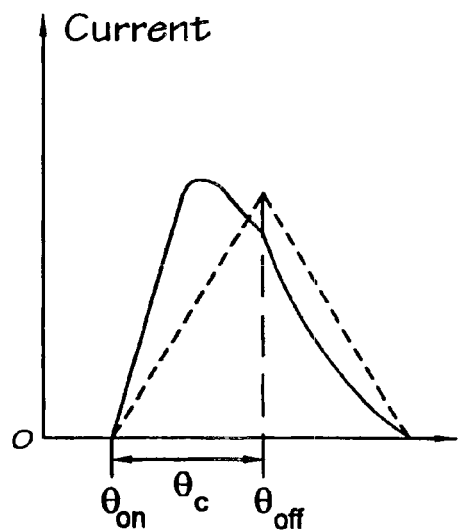
FIG. 4(a) and FIG. 4(b) show motoring and generating current waveforms respectively.
Figure 4B:
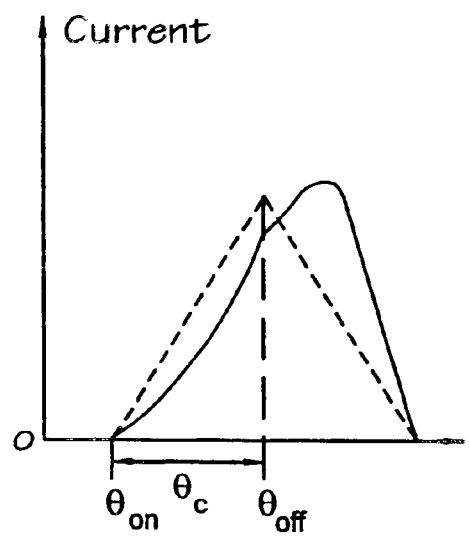
Figure 5A:
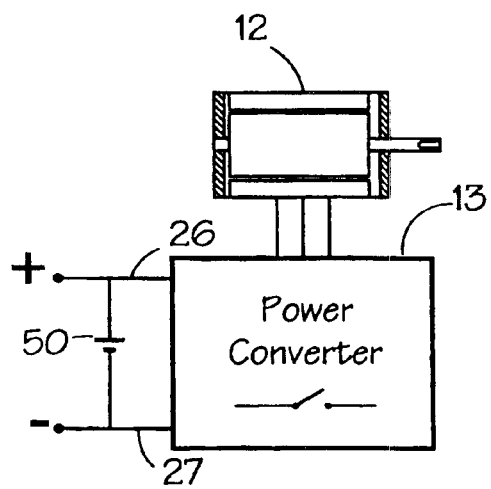
FIG. 5(a) shows a prior art generating system.
Figure 5B:
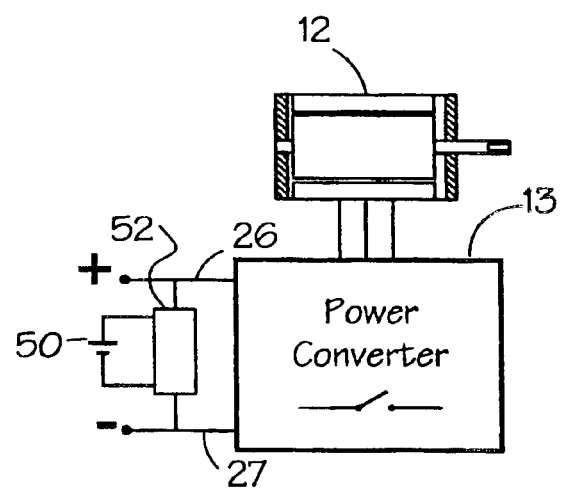
FIG. 5(b) shows a prior art generating system with an up-converter.
Figure 6:
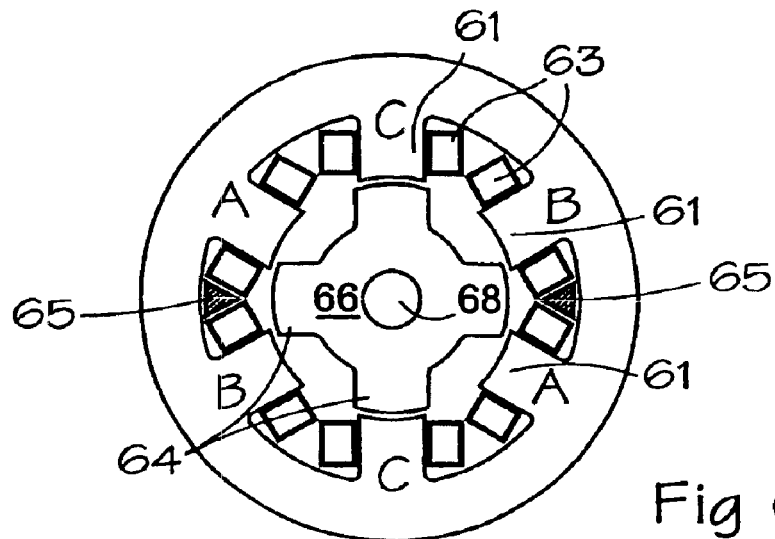
FIG. 6 shows a schematic arrangement of windings, according to an embodiment of the invention.

FIG. 6 shows a cross section of a switched reluctance machine suitable for use with embodiments of the invention. The machine has three phase windings 63 assembled on stator poles 61 of the phases A, B and C. The rotor 66 has rotor poles 64 and is mounted on a shaft 68. The stator also carries a priming winding 65, which in this embodiment is full pitched across the machine, embracing the poles of all the phases, and extending along the longitudinal axis of the stator.

Figure 7:
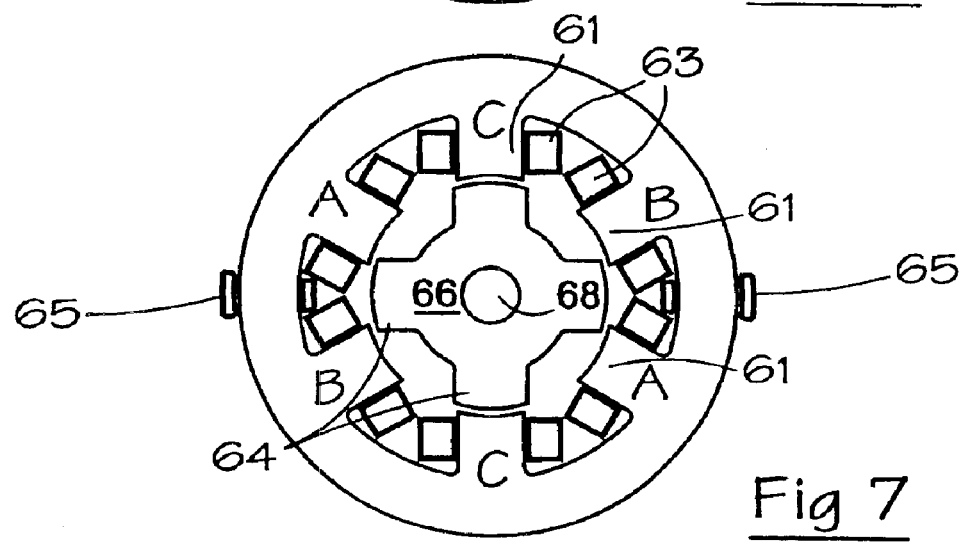
FIG. 7 shows a winding arrangement, according to an embodiment of the invention.
Figure 8:
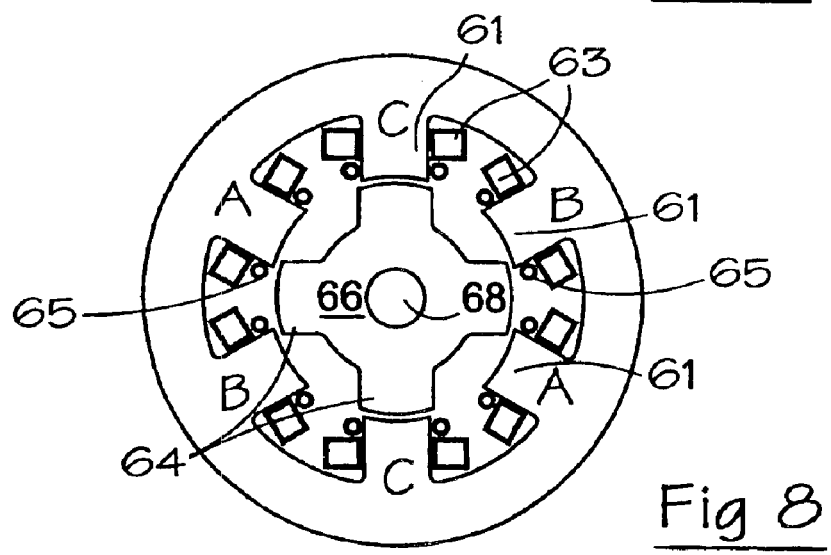
FIG. 8 shows a winding arrangement, according to an embodiment of the invention.

Other embodiments of the priming winding are possible. For example, FIG. 7 shows the embodiment of a gramme-ring type winding 65, wound around the back iron of the stator. This arrangement may be appropriate in some systems where the outer surfaces of the stator are not used as an interface to another component. FIG. 8 shows the priming winding 65 distributed on the stator poles 61. Note that, in the example shown in FIG. 8, all the stator poles are used, though this is not strictly necessary. Nor is it necessary that there is close coupling between the main phase winding 63 and the priming winding 65, unlike a bifilar winding arrangement where the windings are physically arranged to have the highest possible mutual coupling.

It will be appreciated that, although a 3-phase system has been used for illustration, this is purely exemplary and the principles outlined above apply to any number of phases and any combination of numbers of stator and rotor poles.

Figure 9:
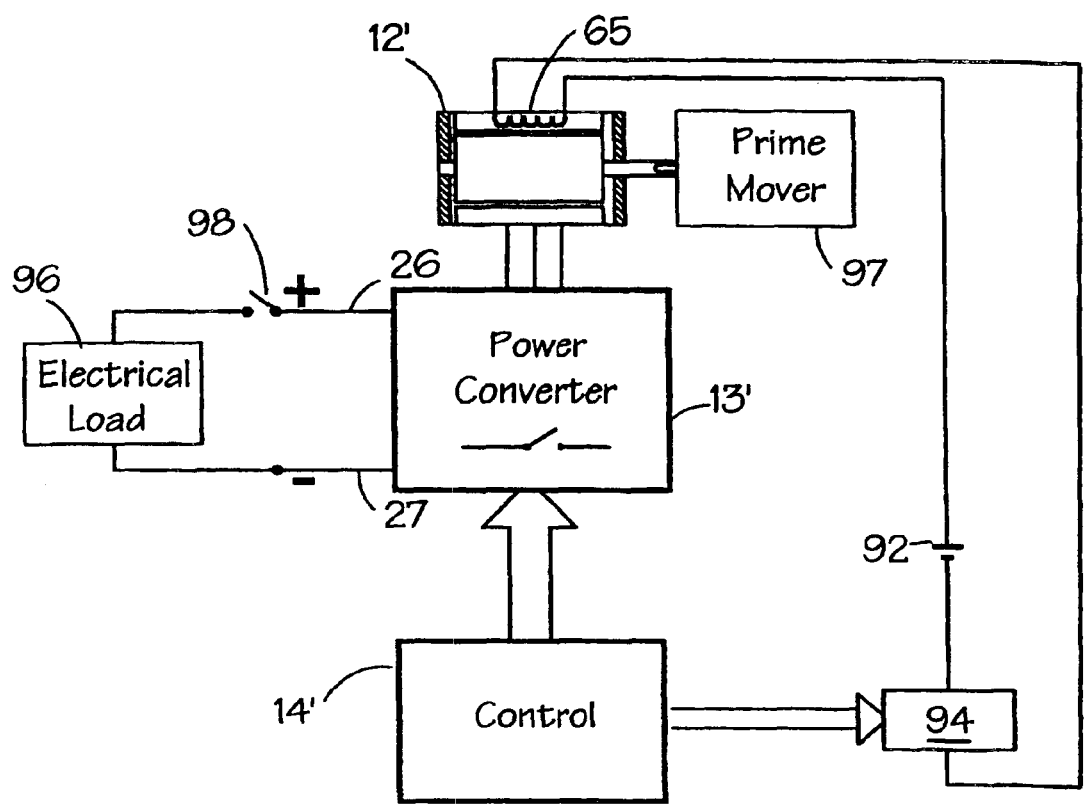
FIG. 9 shows a switched reluctance drive system, according to an embodiment of the invention.

Whatever physical arrangement is adopted for the priming winding, the winding is electrically connected to a separate supply 92, as shown in FIG. 9, by a connecting means 94 under the control of the control system 14'. The priming winding 65 is shown schematically in arrangement with the switched reluctance machine 12'. The connecting means 94 can be a simple mechanical switch or relay, in which case the current flowing in the winding will be largely controlled by the resistance of the priming winding 65. If the resistance is too small to limit the current to a suitable value, either because the resistance is low or the voltage of supply 92 is relatively high, then connecting means 94 can be a chopper unit or other form of current controller known in the art.

It will be noted that in this embodiment there is no electrical connection between the priming winding and the phase windings of the machine, i.e. there is galvanic isolation between them. This is a significant benefit from a safety viewpoint.

In operation, the prime mover 97 will drive the generator by rotating the rotor at some appropriate speed relative to the stator. To start the generator, the priming winding 65 is energized by the control system causing the supply 92 to be connected to the priming winding 65 by operating the connecting means 94. Current flows in the priming winding 65, causing a standing flux to be set up in the machine. This flux will pass through whichever stator pole pair(s) are adjacent to rotor poles, since the flux will naturally prefer to flow in those magnetic circuits with the lowest reluctance. However, since the rotor is turning under the influence of the prime mover, different pole pairs will be preferred at different times, so that a time varying flux is seen by any one pole pair. This flux links the phase windings 63 and so induces a time varying, bi-directional voltage in them. Although the switches 21 and 22 associated with the phase windings remain open, the diodes 23 and 24 of the power converter 13 are still connected, and so they act to rectify the voltage, allowing half cycles of current to flow onto the DC link. Since the switches 21 and 22 are open, the current flows into the DC link capacitor 25, raising its voltage at a rate determined by the current and the capacitor size.

When the DC link voltage has been built up to an appropriate level, the priming winding 65 is disconnected from its supply 92 (i.e., it is de-energized) and thereafter is not used in the operation of the generator. The generator can then be excited, in conventional fashion, from the DC link capacitor 25 via the switches 21 and 22 and the main phase windings 63 and the generator output can then be connected to the electrical load 96 via the output switch 98.

This system can therefore generate onto the DC link even though there is no long-term energy storage on it. Preferably the supply 92 is low compared with the DC link, e.g. 12V compared with 300V. The source 92 may be either a primary cell replaced when used or a rechargeable source. Preferably the priming winding 65 is rated only for short-term operation, thus saving manufacturing cost and taking up negligible space in the machine.

It will be seen that the priming winding 65 is dedicated to the sole purpose of starting the generator, i.e. providing a means of raising the DC link capacitor 25 to a voltage at which it can supply the excitation required by the phase winding(s) 63 for steady state operation of the generator. After the DC link capacitor has reached the appropriate value of voltage, the priming winding 65 is disconnected and has no further duty to perform in steady state operation of the generator.

It will be realized from the above description that the excitation applied to the priming winding is not switched according to rotor position, i.e., it is not dependent on the angular position of the rotor. Preferably it is uni-directional, as described above, though it would be possible to use a supply which is alternating or is uni-directional with high ripple content.

The skilled person will appreciate that variation of the disclosed arrangements are possible without departing from the invention. For example, the invention may be applied to linear as well as rotating machines. Accordingly, the above description of several embodiments is made by way of example and not for the purposes of limitation. It will be clear to the skilled person that minor modifications can be made to the arrangements without significant changes to the operation described above.

What is claimed is:

1. A switched reluctance generator comprising a rotor having a plurality of rotor poles, a stator having a plurality of stator poles, at least one phase winding for exciting two or more of the poles, a priming winding to excite two or more of the poles, and a priming power source separate from that used to excite the phase windings, wherein the priming power source is operably connected to the priming winding.

2. A switched reluctance generator according to claim 1 wherein the priming winding is energized while the rotor is being driven.

3. A switched reluctance generator according to claim 1 wherein the priming power source excites the priming winding independently of rotor position.

4. A switched reluctance generator according to claim 1 wherein the at least one phase winding is provided on the stator poles.

5. A switched reluctance generator according to claim 1 wherein the priming winding is provided on the stator.

6. A switched reluctance generator according to claim 5 wherein the priming winding extends along a longitudinal axis of the stator.

7. A switched reluctance generator according to claim 5 wherein the priming winding is of a gramme-ring type, wound around a back iron part of the stator.

8. A switched reluctance generator according to claim 5 wherein the priming winding is provided around at least one of the stator poles.

9. A switched reluctance generator according to claim 1 wherein the at least one phase winding is excitable by a DC link, the ratio of the voltage of the DC link to the supply voltage for the priming winding being greater than 3.

10. A switched reluctance generator according to claim 1 further comprising means for connecting the priming winding to the priming power source, the means for connecting comprising a switch, a chopper unit or a current controller.

11. A switched reluctance generator according to claim 1 wherein the priming winding and/or its associated priming power source, and/or associated connecting components, are rated for short-term use.

12. A method of starting a switched reluctance generator comprising a rotor having a plurality of rotor poles and a stator having a plurality of stator poles, at least one phase winding defining one or more phases, and at least one priming winding, the method comprising;

driving the rotor relative to the stator;

while the rotor is being driven, energizing the priming winding by forming an electrical connection between the priming winding and a source of electrical energy to excite two or more of the poles and to cause time-varying flux linkage in at least one of the phase windings; and subsequently de-energizing the priming winding and energizing the phase winding(s) of the generator.

13. A method according to claim 12 wherein the switched reluctance generator is connected to a DC link and further comprising de-energizing the priming winding once the voltage of the DC link has reached a pre-determined value and subsequently energizing the phase winding(s) of the generator from the DC link.

14. A method according to claim 13 in which the DC link has a DC capacitor connected across the phase winding(s), the method further comprising:

charging the DC link capacitor by supplying current from the or each phase winding to the DC link capacitor and disconnecting the priming winding from the source once the voltage of the DC link capacitor has reached a pre-determined value.

15. A switched reluctance generator comprising a rotor having a plurality of rotor poles and a stator having a plurality of stator poles, at least one phase winding defining one or more phases, and at least one priming winding, the generator comprising;

means for driving the rotor relative to the stator;

means for energizing the priming winding, while the rotor is being driven, by forming an electrical connection between the priming winding and a source of electrical energy to excite two or more of the poles and to cause time-varying flux linkage in at least one of the phase windings; and means for subsequently de-energizing the priming winding and energizing the phase winding(s) of the generator.

16. A switched reluctance generator according to claim 15 wherein the switched reluctance generator is connected to a DC link and further comprising means for de-energizing the priming winding once the voltage of the DC link has reached a pre-determined value and for subsequently energizing the phase winding(s) of the generator from the DC link.

17. A switched reluctance generator according to claim 16 wherein the DC link has a DC capacitor connected across the phase winding(s), the generator further comprising: means for charging the DC link capacitor by supplying current from the or each phase winding to the DC link capacitor and for disconnecting the priming winding from the source once the voltage of the DC link capacitor has reached a pre-determined value.

18. A switched reluctance generator comprising a rotor having a plurality of rotor poles, a stator having a plurality of stator poles and at least one phase winding arranged to be supplied from a DC link of a generator controller for exciting two or more of the poles and a priming winding arranged to excite two or more of the stator poles during a start procedure, thereby to establish a voltage of pre-determined value on the DC link.

* * * * *